Oct. 27, 1959 L. BODDY 2,910,569
TEMPERATURE RESPONSIVE SYSTEMS
Filed Oct. 11, 1956 2 Sheets-Sheet 1
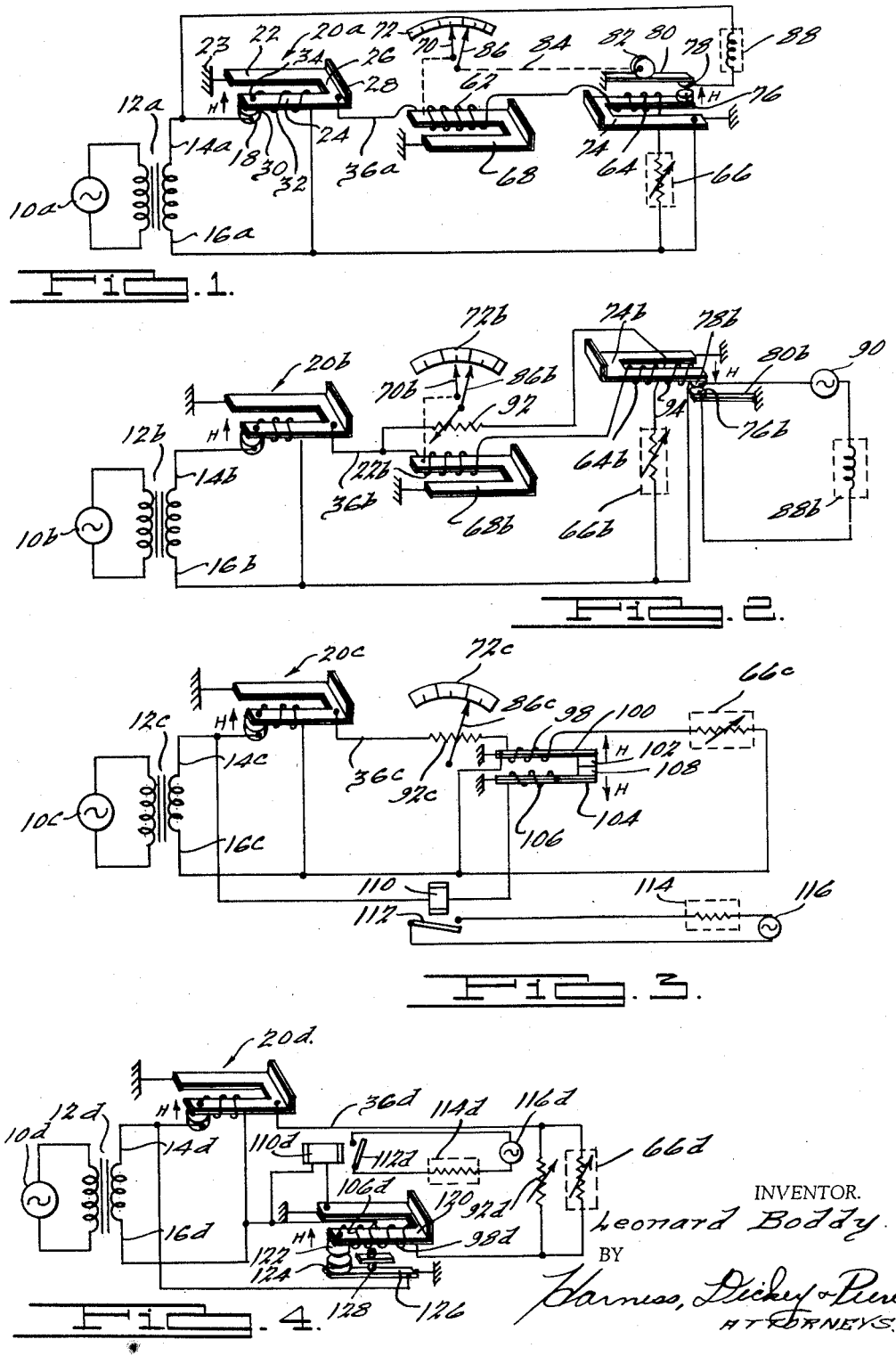
INVENTOR.
Leonard Boddy
BY
Harness, Dickey & Pierce
ATTORNEYS.

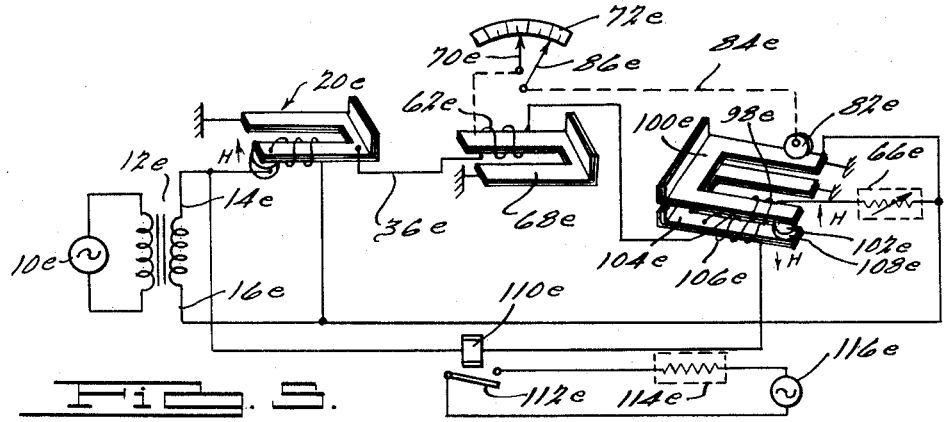
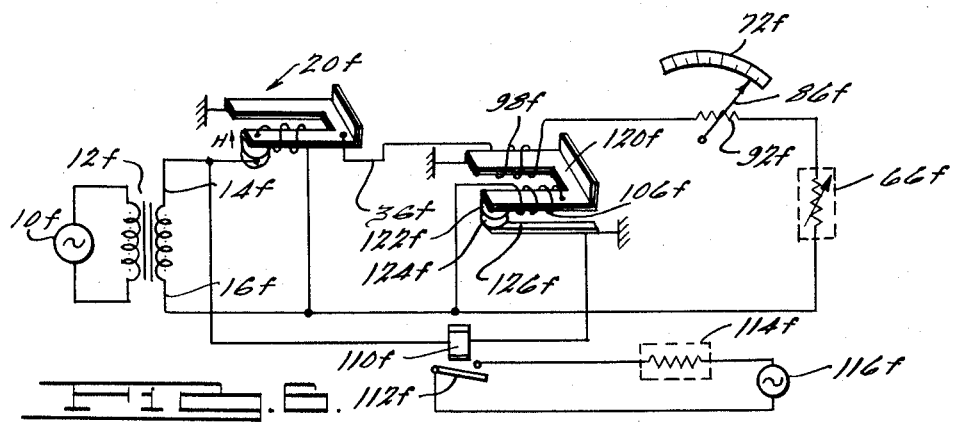
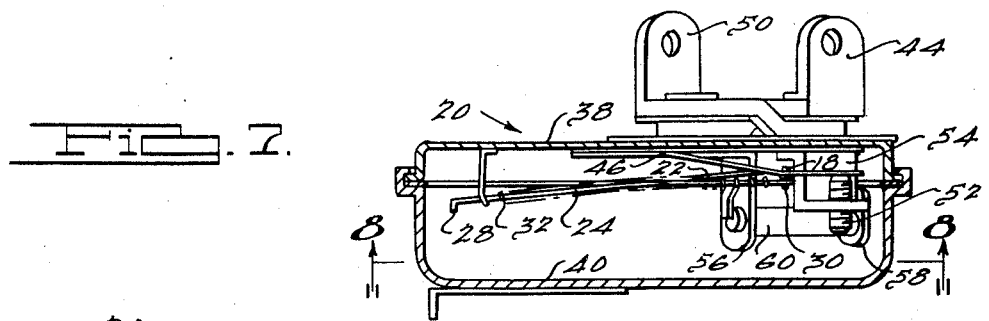
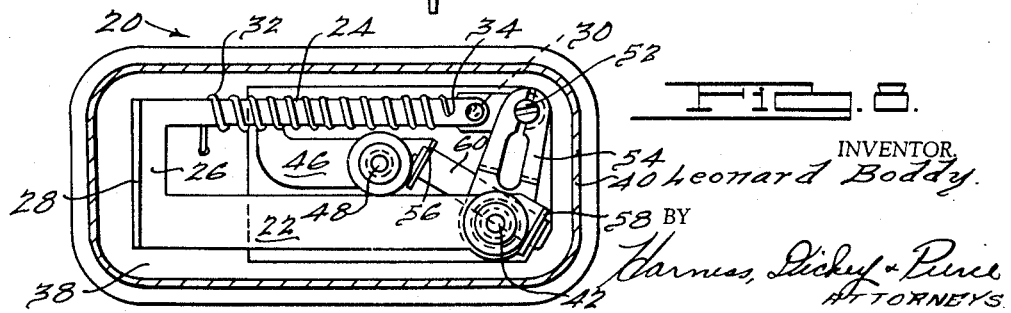

United States Patent Office 2,910,569
Patented Oct. 27, 1959

2,910,569

TEMPERATURE RESPONSIVE SYSTEMS

Leonard Boddy, Ann Arbor, Mich., assignor to King-Seeley Corporation, Ann Arbor, Mich., a corporation of Michigan Application October 11, 1956, Serial No. 615,320

24 Claims. (Cl. 219—20)

This invention relates to temperature responsive systems, and more particularly to temperature signaling and/or controlling systems.

Objects of the present invention are to improve the sensitivity and accuracy of temperature sensing, indicating and control systems, and to reduce the cost of manufacture and maintenance of such systems.

The present inventor has previously disclosed in his application, Serial No. 138,249, filed January 12, 1950, a system including means for sensing the temperature of a body and means responding to that sensing means for performing a control function. A portion of the subject matter of that application is the subject of Patent No. 2,762,997, granted September 11, 1956, while another portion is the subject of application Serial No. 536,226, filed September 23, 1955, as a continuation of the first-noted application. The present application is an improvement upon that arrangement. A number of the elements of the presently disclosed combinations of elements are or may be similar to those disclosed in detail in the referenced patent and application, and recourse may be had thereto for a more complete description of those elements. It is therefore intended to incorporate the disclosure of that patent and of application Serial No. 536,226 by reference, as fully as if those disclosures had been reproduced herein in their entirety.

The manner of accomplishing the above stated and other objects of the invention may be understood from the following detailed description of embodiments of the invention when read with reference to the accompanying drawings, in which:

Figure 1 is a schematic representation of a temperature sensing and indicating and/or controlling system embodying certain of the principles of the present invention;

Fig. 2 is a schematic representation of a modification of the circuit of Fig. 1, illustrating electrical, rather than mechanical, manual setting of the equipment;

Fig. 3 is a schematic representation of another arrangement for performing the temperature sensing and/or control function;

Fig. 4 is a schematic representation of a modified form of the arrangement of Fig. 3;

Fig. 5 is a schematic representation of a further modification, incorporating a number of the features shown in arrangement of Figs. 1 and 3;

Fig. 6 shows a further modified arrangement in which the functions performed by plural elements in certain of the preceding arrangements are consolidated and performed by but one element;

Fig. 7 is a vertical section view of a thermo-electric instrumentality suitable for use as one of the elements in each of the arrangements disclosed in Figs. 1–6 and modifiable to serve as other elements of those arrangements; and Fig. 8 is a sectional view of the thermo-electric instrumentality taken substantially along the line 8—8 of Fig. 7.

The equipment illustrated in Figure 1 of the drawings is adapted to be associated with a source of energy 10a, such as a line source of alternating voltage, which normally tends to vary in average value. Source 10a is connected to the primary winding of step-down transformer 12a so that a reduced-magnitude voltage appears across the secondary winding of that transformer and hence between conductors 14a and 16a. This voltage is applied to the electro-thermal voltage regulating device 20a, the function of which is to receive the noticeably variable voltage between conductors 14a and 16a and to deliver pulsating energy to its load circuits, the effective output voltage of the regulator being substantially independent of the variations in the voltage of the source.

Basically, the regulator 20a, as well as the regulators 20b to 20f, shown in the embodiments of Figs. 2–6, respectively, can be characterized as including a thermally responsive member at least a portion of which tends to move as a consequence of changes in the temperature thereof. Current modulating means, comprising a pair of electrical contacts in the illustrated arrangement, are associated with this member so as to respond to that tendency to move. The current modulating means serve to increase the heat energy supplied to the thermally responsive member in response to decreases in temperature thereof, and vice versa. Consequently, throughout at least a predetermined range of voltages of the source, the current modulating means periodically increase and decrease the energy supplied to the thermally responsive member and cause it to be maintained at a substantially uniform average temperature. On this basis, it will be appreciated that the thermally responsive member receives energy, in pulsating form, at a substantially uniform average rate. Consequently, a load circuit connected in parallel with the regulator will receive energy pulsations having an effective voltage which is substantially independent of variations in the source voltage. A more complete exposition upon the design and theory of operation of the voltage regulators of this type is presented in United States patent application Serial No. 108,773, filed August 5, 1949, now Patent 2,835,885.

As may be seen in the diagrammatic illustration of Fig. 1 of the drawings, the regulator 20a comprises a polymetallic thermo-responsive unit including a pair of leg portions 22 and 24 representatively illustrated as lying substantially in a common plane and extending in spaced parallelism with one another in that plane. One end of leg portion 22 is fixed to a reference surface in any suitable fashion as is indicated by the earthing symbol 23, (which does not connote electrical grounding) and the other end of leg portion 22 is joined to one end of leg portion 24 by means of a crosspiece 26. An upstanding flange 28 is provided to increase the stiffness of crosspiece 26 to the point where that crosspiece will not deflect to any significant degree in response to the mechanical or thermal forces to which the unit is subjected. The other end of leg portion 24 carries an electrical contact 30, that contact being electrically as well as mechanically integral with leg portion 24. Contact 30 is adapted to co-operate with a fixed or adjustably fixed contact 18, and the unit is constructed so that those contacts are in firm engagement with one another when the temperature differential between leg portions 22 and 24 is zero or substantially zero. It will be appreciated that the provision of a U-shaped member of the nature shown will permit compensation for ambient temperature variations since the effect upon the position of contact 30 of heating of leg portion 22 is the opposite of that produced by equal heating of leg portion 24.

Differential heating of leg portions 22 and 24 is accomplished by heating means in the form of a heater winding 32 representatively disposed in heat transfer relationship with the leg portion 24, and, more particularly, coiled around that leg portion. One end of heater winding 32 is electrically connected to leg portion 24 as at 34, and the other end of that winding is connected to conductor 16a. As a result, when the contacts 18 and 30 are closed, heater winding 32 is connected across the secondary winding of transformer 12a so that current flows through contacts 18 and 30 and through the heater winding 32. The resultant heating of leg portion 24 causes the contact-carrying end of that portion to deflect upwardly in a direction to separate contact 30 from contact 18. When the contacts 18 and 30 are separated, the energizing circuit for heater winding 32 is interrupted, and leg portion 24 commences to cool, deflecting in a direction to bring contact 30 into re-engagement with contact 18 to re-establish the initial conditions. Leg portion 24 continues to deflect upwardly and downwardly with a small-amplitude motion tending to maintain the average wattage input to the heater winding 32 constant. As a result, any load circuit or device connected in parallel with heater winding 32, that is, between the polymetallic element and conductor 16a, will receive energy as a series of pulsations the average or effective value of which does not vary with variations in the magnitude of the source 10a voltage.

An appropriate structure capable of operating as the voltage regulator 20a of Fig. 1 is represented (generically as unit 20) in Figs. 7 and 8 of the drawings. The elements of that regulator are mounted within a sealed enclosure constituted by upper and lower cup-shaped members 38 and 40. Leg portion 22 of the polymetallic thermo-responsive element is anchored at its free end to a headed rivet 42 which serves to electrically connect leg 22 to the exposed terminal 44. The contact 18, co-operating with active contact 30 mounted on the free end of leg 24, is carried near one end of the free leg of a U-shaped spring strip 46, the tip of the other leg of which is anchored to the casing by a rivet 48 which is electrically integral with terminal 50. The mounting spring strip 46 for the passive contact 18 is preformed so that it tends to bow downwardly as viewed in Fig. 7 of the drawings and to press against the active contact 30, thereby pre-loading the thermal responsive element. The free end of spring member 46 bears against a screw or cam 52 which limits the downward movement thereof and which is adjustable to establish the regulated voltage output of the unit. Adjusting screw 52 is carried by an L-shaped mounting member 54 which is supported by the rivet 42 but is insulated therefrom as well as from the polymetallic leg portion 22.

Since in some circumstances it may be desirable to shunt the contacts of the regulator with a resistor or a capacitor, clips 56 and 58 are secured by rivets 48 and 42, respectively, and are adapted to support a resistor or capacitor 60. Clip 56 is electrically integral with contact 18 and clip 58 is electrically integral with contact 30. The provision of a resistor or capacitor 60 is normally not necessary and none is illustrated in the circuit diagrams of Figs. 1-6.

Referring again to Fig. 1 of the drawings, the output of regulator 20a appears between conductors 36a and 16a. This output voltage is applied to a series circuit including heater winding 62, heater winding 64 and temperature sensing element 66. Senser 66 is illustrated as a resistor having a variable resistance-temperature characteristic, that is, a resistor having a high temperature coefficient of resistance. While that coefficient may be either negative or positive, it is assumed in the representative disclosure of Fig. 1 to be negative. Senser 66 is disposed, in any well-known fashion, in heat exchange relationship with a body the temperature of which is to be sensed. That body may be the air in a room, the air in a refrigerator, the surface of a pan disposed upon the surface heating unit of a cooking stove, the air within an oven, or a solid body such as meat disposed within an oven, in which case senser 66 would preferably be positioned in an appropriate probe assembly, centrally of the meat. With the average voltage between conductors 36a and 16a being effectively constant, and with the resistance of windings 62 and 64 being relatively constant, the current through the traced series circuit will vary as a function of the resistance of senser 66, and if that unit has a negative temperature coefficient of resistance, the current in the series circuit and through the windings 62 and 64 will increase with increases in the sensed temperature since the resistance of unit 66 decreases with increasing sensed temperatures.

Heater winding 62 serves as a heating means in heat transfer relationship with a polymetallic unit 68 representatively disclosed as a generally U-shaped bimetallic or polymetallic element of the general form of the thermo-responsive element of regulator 20a, detailed in Figs. 7 and 8 of the drawings. The polymetallic unit 68 is mechanically coupled to drive a pointer 70 disposed in indicating relationship with a scale 72. While any appropriate form of receiving, indicating or gauging device may be employed, a suitable unit embodying a U-shaped polymetallic element is disclosed in Fig. 12 in the above-identified Patent No. 2,762,997. The unit 68, in response to an elevation in the temperature of its free leg due to an increase in the current through winding 62, will deflect to move the pointer 70 in a direction to indicate the changed sensed temperature.

Heater winding 64 serves as a heating means disposed in heat transfer relationship with element 74. Element 74 is a polymetallic element and may be identical in form to the thermo-responsive element of the regulator 20a previously described. The tip of one leg is fixed and the tip of the other leg carries an active contact 76 adapted to co-operate with a passive contact 78 supported upon the free end of a cantilever mounted contact arm 80. The position of passive contact 78 is adjustably fixed and, in the illustrated arrangement, contact 76 is spaced therefrom when the legs of element 74 are not differentially heated. As the winding 64 elevates the temperature of that leg of element 74 with which it is associated, contact 76 is moved towards and ultimately into engagement with contact 78. Under any equilibrium condition, the position of contact 76 will be determined by the temperature which is sensed by the senser 66. Consequently, the temperature at which an indicating or control function is to be initiated may be selected by appropriate positioning of the contact 78. In the illustrated arrangement, the position of contact 78 is adjusted by pretensioning, prestressing or biasing the spring contact arm 80 upwardly into engagement with a manually settable cam 82, that cam being mounted upon a shaft, represented at 84, which is also connected to drive an indicator pointer 86 disposed in co-operative relationship with the same scale 72 with which pointer 70 is associated. As a result, when shaft 84 is manually rotated to select the position of cam 82, pointer 86 is concurrently rotated to indicate, upon scale 72, the selected temperature, the unit preferably being calibrated so that performance of the output function will be initiated when the indications of pointers 70 and 86 concur.

It will of course be appreciated that other methods of adjustment may be employed in the arrangement of Fig. 1 including certain variations illustrated in the modifications presented in others of the views. It will also be appreciated that the series interconnection of senser 66 and windings 62 and 64 is but representative, the only requisite being that a change in the resistance of senser 66 be reflected in a change in current through windings 62 and 64, the change of current bearing some significant relationship to the change in resistance.

Contacts 76 and 78, upon closing, complete a circuit from conductor 16a through load device 88 and to conductor 14a, it being representatively assumed that load device 88 is operative with the magnitude of voltage present across the secondary winding of transformer 12a. Load device 88 may be a signal lamp, a buzzer, or any other indicating mechanism, or it may be a control device acting upon additional equipment. Thus, unit 88 may be the winding of an electromagnetic relay or a heater upon an electro-thermal relay or may be the input element of any other relaying or translating mechanism. Unit 88 may in turn control signaling or indicating means or may directly control means for varying the temperature of the environment or body with which senser 66 is in heat transfer relationship. As an example, load device 88 may be a relay controlling, directly or indirectly, the energization of a heating element adapted to heat the body or volume in which senser 66 is disposed.

If the system of Fig. 1 is employed purely as an indicating system, then at the attainment of the selected temperature (assuming, as an example, that it is a heating rather than a cooling function which is being performed) as determined by the setting of cam 82 and pointer 86, contact 76 will be closed to contact 78 to produce the indicating function. Contacts 76 and 78 will remain closed until the sensed temperature drops below the critical value at which time they will separate and terminate the signaling. If the system is employed to control a main source of heat, then the energization of load device 88 should produce de-energization of the main heating unit, so that upon attainment of the selected temperature contacts 76 and 78 will close to terminate main heating which condition will continue until the sensed temperature falls a preselected amount to open contacts 76 and 78 to produce reenergization of the main heating unit. The control system will then operate on a thermostatic basis to regulate the temperature of the body as sensed by senser 66.

Since both the receiver or indicator unit including polymetallic element 68 and heating means 62, and the responder comprising polymetallic element 74 and heating means 64 are actuated and deflected in accordance with the magnitude of the current through the windings 62 and 64, respectively, it will be appreciated that variations in the voltage applied to the circuit including those heating means and senser 66 will produce variations leading to erroneous results. It is therefore very important in a system of this nature that a voltage regulating means such as that shown at 20a be provided.

It will be apparent to those skilled in the art that a reversal of the described operation may be obtained by inverting the relationship of the constituent metals of the polymetallic element 74 or by transferring the heating winding 64 to the back or compensating leg of the element 74, and it will also be apparent that a senser 66 having a high positive temperature coefficient of resistance may also be employed if desired.

The cam adjusting means of the Fig. 1 system may be replaced with electrical adjusting means, if desired, in accordance with the showing of Fig. 2. The systems of Figs. 1 and 2 are identical in many aspects and correponding parts are given corresponding reference characters, with those in Fig. 2 being suffixed with a small letter b. The polymetallic element 74b is formed of metals in an inverted relationship to those of element 74 in Fig. 1, to illustrate that possible modification, so that the tip end of the active leg moves downwardly, carrying contact 78b into engagement with contact 76b at a preselected temperature, that closure resulting in the connection of source 90 to the load device 88b. Since the magnitude of the voltage output of source 90 may be of any selected value, load device 88b may be considered to be a main heater, the output of which is to be thermostatically controlled. Alternatively, device 88b may be any suitable load device as discussed above in connection with load device 88.

The contact carrying arm 80b is shown to be fixed, with the adjustment or setting of the equipment being accomplished by means of a variable resistor or rheostat 92. The resistive element of rheostat 92 is connected between conductor 36b, one of the two output conductors of regulator 20b, and the heater winding 94, disposed upon the same leg of element 74b as is winding 64b, the other end of winding 94 being connected to the return conductor 16b. As a result, the responder including polymetallic element 74b is subjected to two heat sources, one the heat produced by coil 64b which varies with the temperature sensed by senser 66b, and the other a selectable heat produced by coil 94, the magnitude of that heating being controlled by rheostat 92. The slider or wiper of rheostat 92 is mechanically coupled to pointer 86b so that setting of the position of rheostat 92 produces a corresponding motion of pointer 86b to produce an indication, in conjunction with scale 72b, of the setting. With this difference, the system of Fig. 2 operates similarly to that of Fig. 1.

In the arrangements illustrated in Figs. 1 and 2 of the drawings, the contacts change from their opened condition to their closed condition upon the attainment of a preselected sensed temperature, remain in their closed condition as long as that sensed temperature is equal to or greater than the preselected value, and change to their opened condition only when the sensed temperature drops below the preselected value. Consequently, those systems operate on a purely thermostatic basis. Reduction in the magnitude of the temperature undulations, that is, reduction of the overshoot in both directions occurring in thermostatic systems, may be obtained by practicing the principles embodied in the systems illustrated in Figs. 3-6 of the drawings.

The system represented in Fig. 3 of the drawings includes a sensing circuit comprising a senser 66c, a heater winding 98 disposed in heat transfer relationship with a polymetallic element 100, the combination of the latter two elements serving as a responder, and a rheostat 92c the adjustment of which produces corresponding movement of pointer 86c co-operating with scale 72c. Of course, a pointer, corresponding to pointer 70 in Fig. 1, may be driven by polymetallic element 100, if desired, that is, element 100 can serve both as a responder and as a receiver. This sensing circuit is supplied with a substantially constant average voltage by regulating device 20c, the supply voltage appearing between conductors 36c and 16c. Polymetallic strip 100 may be a simple straight cantilever-mounted strip, as illustrated, or, as will more clearly be seen from the ensuing description of other systems, may be a U-shaped polymetallic element similar to the element 74 in Fig. 1 of the drawings. The current through heating winding 98 will be determined by the resistance of senser 66c, and since winding 98 serves as a heating means in heat transfer relationship with strip 100, the position of the free end of the polymetallic strip 100 will be determined, at any time and for any setting of rheostat 92 by the resistance of senser 66c and hence by the sensed temperature.

In the representatively disclosed arrangement, the free end of strip 100 moves upwardly as its temperature is increased, so that, with a senser having a high negative temperature coefficient of resistance, the higher the sensed temperature, the higher the position of the contact 102 carried by strip 100. The position of contact 102 is effectively continually sensed by a self-interrupting sending device comprising a cantilever-mounted polymetallic strip 104, a heating winding 106 mounted in heat transfer relationship therewith, and a contact 108 supported upon the free end of strip 104 and matable with contact 102. Strip 104 may be individually ambient temperature compensated, if desired.

One end of the heating means 106 is electrically integral with strip 104 while the other end thereof is connected through the winding of relay 110 to conductor 14c. Since polymetallic strip 100 is electrically integral with conductor 16c, whenever contacts 102 and 108 are in engagement a circuit is completed from one side of the secondary winding of transformer 12c, at conductor 14c, through the winding of relay 110, through the heating means 106, the polymetallic strip 104, contact 108, contact 102, polymetallic strip 100, and via conductor 16c to the other side of the secondary winding of transformer 12c. The completion of this circuit initiates heating of polymetallic strip 104 by heater winding 106 and additionally produces immediate operation of relay 110 since that relay is illustratively shown to be of the electromagnetic type. The closure of contact 112 of relay 110 completes an energizing circuit for load device 114 from source 116, it being assumed that device 114 is the main source of heat which is in heat transfer relationship with the body the temperature of which is sensed by senser 66c. In a short period the temperature of polymetallic element 104 will have been sufficiently elevated by heating means 106 to deflect the free end of that element downwardly, carrying contact 108 away from contact 102. Upon the separation of those contacts the energizing circuit for both relay 110 and heating means 106 is interrupted so that device 114 is de-energized and so that polymetallic strip 104 will commence to cool. Polymetallic strip 104 is prestressed, prebiased or pretensioned in an upward direction so as to tend to maintain contact 108 in engagement with contact 102 in the absence of heating by heater 106 so that as that strip cools, it deflects contact 108 towards and eventually into engagement with contact 102, re-establishing the energized conditions of heating means 106, relay 110 and device 114. The position of the free end of strip 104, at the instant of engagement between contacts 108 and 102, will therefore vary in accordance with the then position of contact 102, which, in turn, is controlled conjointly by manually settable rheostat 92c and by senser 66c. It will be apparent that the higher the position of contact 102 the less strip 104 will have to be moved downwardly, against its pretension or prestress, to produce a separation of contacts 108 and 102, and conversely, the lower the position of contact 102, the higher the temperature to which polymetallic element 104 must be elevated to produce a separation of the electrical contacts, the magnitude of those temperatures being adjustable by selective variation of the initial relative positions of strips 100 and 104. Under the former condition, strip 104 will be elevated to the requisite contact-separating temperature relatively quickly so that relay 110 will be operated for a relatively short time; while under the latter condition, current must be passed through winding 106 for a longer interval of time to produce the requisite temperature elevation of strip 104 so that relay 110 and main heater 114 will be energized for a longer period of time. When the sensed temperature is low, senser 66c (assuming a negative temperature coefficient of resistance) will be at a relatively high resistance value, the current through winding 98 will be relatively low (for any given setting of rheostat 92c) and the position of contact 102 will be relatively low. Consequently, contacts 102 and 108 will be closed for a substantial period and main heater 114 will be energized for that period. As the sensed temperature rises, the resistance of senser 66c falls, the current through coil 98 increases and the position of contact 102 will be slowly moved upwardly in accordance with the increase in temperature. Therefore, the temperature to which strip 104 must be elevated to produce separation of contacts 102 and 108 will be correspondingly successively reduced so that the periods of energization of heating means 106, relay 110 and main heater 114 will gradually decrease. Thus, as the sensed temperature rises, the percentage of time during which main heater 114 is energized is slowly decreased until at the preselected temperature, determined by the setting of rheostat 92c, main heater 114 will be energized just sufficiently to maintain the body at that selected temperature. If for any reason the temperature of the body tends to fall below the selected value, that fact will be reflected by variation of the resistance of senser 66c and a lowering of the position of contact 102 so that contacts 102 and 108 will be energized for longer periods during each of the operational cycles, producing an increased average energization of the main heater 114. Conversely, if for any reason there is overshooting or the attainment by the body of a temperature higher than that preselected, contact 102 will move upwardly, less heat will be required to deflect strip 104 adequately to separate contacts 108 and 102 and the average energization of the main heater 114 will be reduced. However, it is contemplated and preferred that the electrical, mechanical and thermal parameters be selected so that contact 102 will never be elevated beyond the reach of contact 108, cyclic operation continuing and main heater 114 always being energized for at least a portion of each such cycle. It will therefore be perceived that in the operation of the unit, assuming the body to be initially cool, main heater 114 will be energized for the major portion of the time, with its average energization being tapered off as the temperature of the body rises, so that the slope of the average heat output versus time curve of the main heater 114 will gradually decrease, that slope approaching zero as the body approaches the preselected temperature.

For the reasons above noted, it is very important that the sensing circuit including senser 66c and heater winding 98 on thermo-responsive element 100 be compensated against variations in the voltage of source 10c so that the preferred regulating unit 20c is again provided. The unit comprising thermo-responsive element 104 and heater winding 106, however, tends to maintain a constant current in the circuit in which it is included so that it is not at all imperative that the voltage applied to that sending circuit be regulated, and in the illustrated arrangement regulating device 20c is not employed to supply current to heater winding 106.

It is important to appreciate that the system parameters are selected so that even at the coldest of the temperatures in the expected range of temperatures there is some current through winding 98 so that polymetallic element 100 is at a temperature above the ambient value. By virtue of this arrangement, the position of contact 102 will continuously reflect the sensed temperature over the complete range of expected temperatures, although for the same sensed temperature its position will not necessarily be the same with different adjustments of rheostat 92c. For example, if senser 66c is disposed in heat transfer relationship with a body the temperature of which may be expected to vary from, say, 70° F. to 450° F., for any setting of rheostat 92c, the position of contact 102 will tend to be different for each temperature within that entire range of temperatures. The same contacting cycle can be preserved for any of these positions by adjustment of the initial relative positions of strips 100 and 104.

The closure of contacts 102 and 108 immediately establishes conditions tending to produce the separation of those contacts. As one of those conditions, heater winding 106 is energized. The time required for contact 108 to be moved downwardly out of engagement with contact 102 (assuming, for the moment, that contact 102 is fixed in position) will be determined by the position of contact 102 and the prestressing force in element 104, the size of winding 106, the thermal conductivity between the wire, 106, through its insulation and to element 104, and other similar factors. As the other of the two noted conditions tending to produce separation of contacts 102 and 108, it will be observed that with those contacts closed main heater 114 is energized tending to elevate the temperature of the body and hence the temperature of senser 66c which increases the current through winding 98, tending to heat element 100 so as to deflect contact 102 upwardly. The thermal lags in this loop include the time for main heater 114 to respond to the energization thereof and increase its surface temperature, the time required for the body temperature to become sensibly increased as a result of that heating, the time required for that increase in body temperature to be conducted to the sensing resistor and reflected in a change in the resistance characteristics of that resistor, as well as the time lags associated with the transfer of heat from winding 98 to element 100. It is important to the contemplated operation of the present system that the former time lag be substantially less than the latter so that while contact 102 may tend to move upwardly during the period of energization of main heater 114, it is the much more rapid downward motion of contact 108 which actually produces the separation of contacts 102 and 108. The energization of main heater 114 is terminated primarily, then, as the result of the motion of contact 108 and, similarly, re-energization of main heater 114 results primarily from movement of contact 108 towards contact 102 rather than from the minor downward movement of the contact 102 resulting from what cooling of the body may occur during the de-energized period of heater 114. The time constant of the thermal circuit including the sender 104—106 is small relative to the time constant of the sensing circuit. This difference in time constants manifests itself physically in the fact that the average temperature velocity, or average rate of change of temperature of the polymetallic element 104 produced as a result of the closure of contacts 102 and 108, is great relative to the average temperature velocity or rate of change of temperature of polymetallic element 100 incurred in response to that same closure of the mating contacts. These changes in temperatures of the polymetallic elements 100 and 104 may not be truly reflected in corresponding changes of physical position due to the interaction produced by the prestressing or pretensioning of element 104.

The system shown in Fig. 4, operationally similar to that shown in Fig. 3, illustrates that the adjusting rheostat may be disposed in parallel rather than in series with the senser and that a single polymetallic element, rather than a pair of mating polymetallic elements, may be utilized if preferred. The similarities between Figs. 4 and 3 are pointed out by the use of common reference characters, those employed in Fig. 4 being provided with the distinguishing suffix d.

In the system of Fig. 4 the sending and responding functions are performed by a unitary polymetallic element 120 representatively of U-shaped configuration to provide ambient temperature compensation, with the tip of the back or compensating leg being fixed and with the free end of the active leg carrying a contact 122. Contact 122 is adapted to co-operate with and normally engages contact 124 supported upon cantilevered contact springs 126. Spring 126 is pretensioned, prestressed or biased upwardly against a screw 128 (or an equivalent cam) which adjustably fixes the uppermost position of contact 124. In the disclosed arrangement, two windings, windings 98d and 106d, are disposed upon the same leg of the polymetallic element 120, representatively upon the active legs to provide proper operation under the assumed disposition of the constituent elements of polymetallic 120, under the assumed provision of normally open contacts 112d for relay 110d and under the assumed use of a high negative temperature coefficient of resistance element 66d. Since one end of winding 106d is electrically integral with polymetallic element 120, the assembly including element 120, winding 106d, contacts 122 and 124, contact spring 126 and screw 128 may be identical to the structure disclosed in Figs. 7 and 8 of the drawings (the resistor being omitted as unnecessary), that structure being modified only by the addition of winding 98d which may be disposed adjacent or wound upon winding 106d.

While a rheostat 92d (the wiper of which may co-operate with a scale as in the systems of Figs. 2 and 3) is shown connected in parallel with member 66d and in series with winding 98d across the regulated voltage source, it will be appreciated that screw 128 may serve as the adjusting means, if desired, in accordance with the teachings of the Fig. 1 system.

The operation of the Fig. 4 system is, in general, identical to that of Fig. 3 in so far as the control of the main heater 114d is concerned. However, the active leg of polymetallic element 120 is subjected to conjoint control by winding 98d and 106d so that its temperature will, at any instant, be determined by the sum of the heating actions of the two heating means associated therewith. The heat supplied by coil 98d will vary only with the sensed temperature, that is, will be determined by the resistance of senser 66d. Winding 106d is connected as winding 106 in Fig. 3, that is, as a self-interrupter, with the energizing circuit for winding 106d including contacts 122 and 124. Upon the closure of those contacts heating winding 106d will be energized to heat the active leg of polymetallic element 120 to produce deflection of that element in a direction to separate contacts 122 and 124. The temperature elevation required to produce that separation will be determined, with any given setting of screw 128, by the temperature to which that leg has already been elevated by winding 98d. Thus, if the sensed temperature is low so that little heat is added to the active leg of element 120 by winding 98d, a substantial amount of heat will have to be added by winding 106d to raise the temperature of the active leg of element 120 to the contact-separating value. This will require a relatively long period of time during which relay 110d will be operated to cause the energization of main heater 114d. Conversely, if the sensed temperature is relatively high so that coil 98d has raised the temperature of the active leg measurably, then but little heat will have to be added by winding 106d to raise the temperature of the active leg of element 120 to the contact-separating value so that relay 110d will be operated for a much shorter period and main heater 114d will produce a lower average level of heat energy output. The considerations and characteristics above discussed in connection with Fig. 3 again apply, noting that the rate of change of temperature of the active leg of element 120 produced by energization of winding 106d, upon closure of the contacts, is substantially greater than the rate of change of temperature of that leg produced by coil 98d as a consequence of the additional heating of the body resulting, in any single cycle, from the closure of contacts 122 and 124 and the consequent heating of the body.

The system of Fig. 5 is presented to illustrate how the Fig. 3 system may be modified to provide cam adjustment, in accordance with the teachings of the Fig. 1 system, and further illustrates that each of the co-operating polymetallic elements may be individually ambient compensated, if desired. Thus, polymetallic element 104e, a constituent element of the sender and carrying contact 108e, is shown to be U-shaped, and responds to heat applied to its active leg by moving contact 108e downwardly away from contact 102e. Contact 102e is carried by the free end of the active leg of polymetallic element 100e, a constituent element of the responder and also shown to be U-shaped. Cam 82e, corresponding to cam 82 in Fig. 1, is positioned to act upon the back or compensating leg of element 100e although it could also be employed in conjunction with the back or compensating leg of polymetallic element 104e. In the illustrated relationship, the back or compensating leg of element 100e should be prestressed, pretensioned or biased upwardly into engagement with cam 82e so that it will follow the surface of that cam as the cam is rotated to change the effective position or bias of the compensating leg of element 100e. As noted above in the discussion of the Fig. 3 system, the active leg of polymetallic element 100e may be mechanically coupled to the indicating pointer, here pointer 70e, to provide a continuing visible indication of the sensed temperature, in which case the provision of the separate receiver polymetallic element 68e would not be necessary.

In the event that element 100e is employed both as a responder and as a receiver, in the above-noted manner, it is then desirable to associate the adjusting cam with the back or compensating leg of element 104e rather than, as shown, with the back or compensating leg of element 100e.

In the system of Fig. 6 a receiver is not provided, although it will be clear that a receiver may be inserted in each of the systems of Figs. 3, 4 and 6 in accordance with the teachings of Figs. 1, 2 and 5, if desired, or, alternatively, a pointer may be mechanically coupled to the free end of, in the illustrated arrangement, the back or compensating leg of the responder 120f so that responder will act both as such and as a receiver. The system of Fig. 6 is presented to illustrate how the system of Fig. 4 may be modified by reversing the temperature coefficient of resistance of the senser and by mounting each of the windings on an individual leg of the responder-sender unit. Thus, the responder winding 98f is disposed in heat transfer relationship with the back or compensating leg of the polymetallic element 120f and is connected, representatively, in series with adjusting rheostat 92f and senser 66f, which, in this case, is assumed to have a high positive temperature coefficient of resistance. Consequently, at low sensed temperatures the resistance of senser 66f is low so that the current through winding 98f is high, producing a substantial elevation of the temperature of the back or compensating leg of polymetallic element 120f. The resultant deflection of that leg (with the assumed orientation of the constituent metallic element) is in a direction (the righthand end moving upwardly) to bring contact 122f more tightly into engagement with contact 124f. As the sensed temperature increases, the resistance of senser 66f increases, the current through heating means 98f decreases, the back or compensating leg of element 120f becomes less deflected, and the force pressing contact 122f into engagement with contact 124f is diminished. Under the former condition, that of low sensed temperature, self-interrupting winding 106f will have to add a substantial quantity of heat to the active leg of element 120f to produce the separation of contacts 122f and 124f. During the length of time required to produce this elevation of temperature of the active leg, relay 110f will be operated and main heater 114f will be energized. Under the latter condition, that of a higher sensed temperature, the temperature of the active leg of element 120f will have to be elevated to a lesser extent by heating winding 106f to produce the separation of the contacts so that relay 110f will be operated and main heater 114f will be energized for a shorter period of time.

It will be appreciated that the concept of employing a sender to follow a responder to produce an output signal which varies in average magnitude with variations in sensed temperature may be executed in ways other than those shown in Figs. 3 to 6 of the drawings, including changing from the shown normally open relay contacts to normally closed relay contacts inversion of the polymetallic element, changes in the direction of the temperature coefficient of resistance of the senser, and shifting of the heater windings to the other legs of the polymetallic elements, or any combination of these. Those skilled in the art will be able to perceive other modifications based upon the disclosures here presented, the teachings being adequate to permit substantial changing of the preferred arrangements within the scope of the invention.

What is claimed is:

1. In a load controlling apparatus for applying electrical energy from a source of electrical energy to an electrical resistance type heater as a series of rapidly recurring pulses, the average value of which is varied in accordance with the sensed temperature of a body, first and second matable electrical contacts, means including said contacts for controlling the connection of the heater to the source of electrical energy, first and second electrical heating means, temperature sensing means in said heat transfer relationship with the body and having an electrical resistance which varies in accordance with the sensed temperature for continuously controlling the current through said first heating means, positioning means including said first heating means and said sensing means for continuously controlling the position of said first contact in accordance with the temperature sensed by said temperature sensing means, and means including said second heating means for repetitively moving one of said electrical contacts into and out of engagement with the other one of said electrical contacts independently of the effects of the heating of the heater and independently of changes in the sensed temperature of the body, the rate of said repetitive movement being high relative to those changes of position of said first contact produced by said positioning means.

2. In a load controlling apparatus for applying electrical energy from a source of electrical energy to an electrical resistance type heater as a series of rapidly recurring pulses, the average value of which is varied in accordance with the sensed temperature of a body, first and second matable electrical contacts, means including said contacts for controlling the connection of the heater to the source of electrical energy, polymetallic means for controlling the relative positions of said electrical contacts, first and second electrical heating means in heat transfer relationship with said polymetallic means, temperature sensing means in heat transfer relationship with the body and having an electrical resistance which varies in accordance with the sensed temperature for continuously controlling the current through said first heating means, positioning means including said polymetallic means, said first heating means and said sensing means for continuously controlling the position of said first contact in accordance with the temperature sensed by said temperature sensing means, and means including said polymetallic means and said second heating means for repetitively moving one of said electrical contacts into and out of engagement with the other one of said electrical contacts independently of the effects of the heating of the heater and independently of changes in the sensed temperature of the body, the rate of change of temperature of said polymetallic means produced by said second heating means being high relative to the rate of change of temperature of said polymetallic means produced by said first heating means as controlled by said temperature sensing means.

3. In a load controlling apparatus for applying electrical energy from a source of electrical energy to an electrical resistance type heater as a series of rapidly recurring pulses, the average value of which is varied in accordance with the sensed temperature of a body, first and second matable electrical contacts, means including said contacts for controlling the connection of the heater to the source of electrical energy, first and second electrical heating means, temperature sensing means in heat transfer relationship with the body and having an electrical resistance which varies in accordance with the sensed temperature for continuously controlling the current through said first heating means, positioning means including said first heating means and said sensing means for continuously controlling the position of said first contact in accordance with the temperature sensed by said temperature sensing means, and contact moving means including said second heating means for repetitively moving one of said electrical contacts into and out of engagement with the other one of said electrical contacts independently of the effects of the heating of the heater and independently of changes in the sensed temperature of the body, the rate of change of relative contact position produced by said contact moving means being high relative to the rate of change of relative contact position produced by said positioning means.

4. In a system for controlling the temperature of a body in heat transfer relationship with an electrical resistance type heater by applying electrical energy from a source of electrical energy to the heater as a series of pulses of energy, the average energy value of which is varied in accordance with the sensed temperature of the body, first and second matable electrical contacts, means including said contacts for controlling the energization of the heater, first and second electrical heating means, temperature sensing means in heat transfer relationship with the body and having an electrical resistance which varies in accordance with the sensed temperature for continuously controlling the current through said first heating means, positioning means including said first heating means and said sensing means for continuously controlling the position of said first contact in accordance with the temperature sensed by said temperature sensing means, and contact moving means including said second heating means for repetitively moving one of said electrical contacts into and out of engagement with the other one of said electrical contacts independently of the effects of the heating of the heater and independently of changes in the sensed temperature of the body, the time required for the relative positions of said contacts to be changed as a result of energization of the heater, sensed change of body temperature and action by said positioning means being long relative to the time required for the relative positions of said contacts to be changed by said contact moving means.

5. In a system for controlling the temperature of a body in heat transfer relationship with an electrical resistance type heater by applying electrical energy from a source of electrical energy to the heater as a series of pulses of energy, the average energy value of which is varied in accordance with the sensed temperature of the body, first and second matable electrical contacts, means including said contacts for controlling the energization of the heater, polymetallic means for controlling the relative positions of said electrical contacts, first and second electrical heating means in heat transfer relationship with said polymetallic means, temperature sensing means in heat transfer relationship with the body and having an electrical resistance which varies in accordance with the sensed temperature for continuously controlling the current through said first heating means, positioning means including said polymetallic means, said first heating means and said sensing means for continuously controlling the position of said first contact in accordance with the temperature sensed by said temperature sensing means, and contact moving means including said polymetallic means and said second heating means for repetitively moving one of said electrical contacts into and out of engagement with the other one of said electrical contacts independently of the effects of the heating of the heater and independently of changes in the sensed temperature of the body, the time required for the relative positions of said contacts to be changed as the result of energization of the heater, sensed change of body temperature and action by said positioning means being long relative to the time required for the relative positions of said contacts to be changed by said contact moving means.

6. In a system for controlling the temperature of a body in heat transfer relationship with an electrical resistance type heater by applying electrical energy from a source of electrical energy to the heater as a series of pulses of energy, the average value of which is varied in accordance with the sensed temperature of the body, first and second matable electrical contacts, means including said contacts for controlling the energization of the heater, first and second electrical heating means, temperature sensing means in heat transfer relationship with the body and having an electrical resistance which varies in accordance with the sensed temperature for continuously controlling the current through said first heating means, positioning means including said first heating means and said sensing means for continuously controlling the position of said first contact in accordance with the temperature sensed by said temperature sensing means, contact moving means including said second heating means for repetitively moving one of said electrical contacts into and out of engagement with the other one of said electrical contacts independently of the effects of the heating of the heater and independently of changes in the sensed temperature of the body, the time required for the relative positions of said contacts to be changed as a result of energization of the heater, sensed change of body temperature and action by said positioning means being long relative to the time required for the relative positions of said contacts to be changed by said contact moving means, and manually adjustable means for selecting the temperature at which the body is to be maintained.

7. In a system for controlling the temperature of a body in heat transfer relationship with an electrical resistance type heater by applying electrical energy from a source of electrical energy to the heater as a series of pulses of energy, the average energy value of which is varied in accordance with the sensed temperature of the body, first and second matable electrical contacts, means including said contacts for controlling the energization of the heater, first and second electrical resistance heating means, temperature sensing means in heat transfer relationship with the body and having a high temperature coefficient of resistance, circuit means interconnecting said first heating means and said temperature sensing means with the source to produce a varying current through said first heating means with variations in the sensed temperature of the body, positioning means including said circuit means for continuously controlling the position of said first contact in accordance with the temperature sensed by said temperature sensing means, and contact moving means including said second heating means, the source and said electrical contact for repetitively moving one of said electrical contacts into and out of engagement with the other one of said electrical contacts independently of the effects of the heating of the heater and independently of changes in the sensed temperature of the body, the rate of said repetitive movement being high relative to those changes of position of said first contact produced by said positioning means.

8. The combination of claim 7 further characterized in this that said one of said electrical contacts is said first contact.

9. The combination of claim 7 further characterized in this that said one of said electrical contacts is said second contact.

10. In a system for controlling the temperature of a body in heat transfer relationship with an electrical resistance type heater by applying electrical energy from a source of electrical energy to the heater as a series of pulses of energy, the average energy value of which is varied in accordance with the sensed temperature of the body, self interrupting electro-thermal means connected to the source for supplying a pulsating voltage having a substantially constant average value, first and second matable electrical contacts, means including said contacts for controlling the energization of the heater, first and second electrical resistance heating means, temperature sensing means in heat transfer relationship with the body and having a high temperature coefficient of resistance, circuit means interconnecting said first heating means said temperature sensing means and said electro-thermal means to produce a varying current through said first heating means with variations in the sensed temperature of the body, positioning means including said circuit means for continuously controlling the position of said first contact in accordance with the temperature sensed by said temperature sensing means, and contact moving means including said second heating means, the source and said electrical contacts for repetitively moving one of said electrical contacts into and out of engagement with the other one of said electrical contacts independently of the effects of the heating of the heater and independently of changes in the sensed temperature of the body, the rate of said repetitive movement being high relative to those changes of position of said first contact produced by said positioning means.

11. In a system for controlling the temperature of a body in heat transfer relationship with an electrical resistance type heater by applying electrical energy from a source of electrical energy to the heater as a series of pulses of energy, the average energy value of which is varied in accordance with the sensed temperature of the body, first and second matable electrical contacts, means including said contacts for controlling the energization of the heater, polymetallic means for controlling the relative positions of said electrical contacts, first and second electrical resistance heating means in heat transfer relationship with said polymetallic means, temperature sensing means in heat transfer relationship with the body and having a high temperature coefficient of resistance, circuit means interconnecting said first heating means and said temperature sensing means with the source to produce a varying current through said first heating means with variations in the sensed temperature of the body, positioning means including said circuit means and said polymetallic means for continuously controlling the position of said first contact in accordance with the temperature sensed by said temperature sensing means, contact moving means including said polymetallic means, said second heating means, the source and said electrical contacts for repetitively moving one of said electrical contacts into and out of engagement with the other one of said electrical contacts independently of the effects of the heating of the heater and independently of changes in the sensed temperature of the body, the rate of change of temperature of said polymetallic means produced by said second heating means being high relative to the rate of change of temperature of said polymetallic means produced by said first heating means as controlled by said temperature sensing means.

12. The combination of claim 11 further characterized in this that said polymetallic means includes two polymetallic legs, heating of one of said legs producing relative movement of said electrical contacts in a direction opposite to that produced by heating of the other one of said legs.

13. The combination of claim 12 further characterized in this that both of said heating means are disposed in heat transfer relationship with one of said legs.

14. The combination of claim 12 further characterized in this that said first and second heating means are disposed in heat transfer relationship with different ones of said legs.

15. In a system associable with an electrical resistance type heater and with a source of variable voltage for controlling the temperature of a body in heat transfer relationship with the heater by applying electrical energy from a source of electrical energy to the heater as a series of pulses of energy, the average energy value of which is varied in accordance with the sensed temperature of the body, self-interrupting electro-thermal means connected to the source for supplying a pulsating voltage having a substantially constant average value, first and second matable electrical contacts, means including said contacts for controlling the energization of the heater, polymetallic means for controlling the relative positions of said electrical contacts, first and second electrical resistance heating means in heat transfer relationship with said polymetallic means, temperature sensing means in heat transfer relationship with the body and having a high temperature coefficient of resistance, circuit means interconnecting said first heating means, said temperature sensing means and said electro-thermal means to produce a varying current through said first heating means with variations in the sensed temperature of the body, positioning means including said circuit means and said polymetallic means for continuously controlling the position of said first contact in accordance with the temperature sensed by said temperature sensing means, contact moving means including said polymetallic means, said second heating means, the source and said electrical contacts for repetitively moving one of said electrical contacts into and out of engagement with the other one of said electrical contacts independently of the effects of the heating of the heater and independently of changes in the sensed temperature of the body, the rate of change of temperature of said polymetallic means produced by said second heating means being high relative to the rate of change of temperature of said polymetallic means produced by said first heating means as controlled by said temperature sensing means.

16. In a load controlling apparatus for association with a source of variable voltage and a body the temperature of which is to be sensed, self-interrupting electro-thermal means connected to the source for supplying a pulsating voltage having a substantially constant average value, an indicating scale, first and second indicating pointers cooperating with said scale, first electro-responsive means including a first coil responsive to variable current therethrough for moving said first pointer relative to said scale, a two-state load device, a pair of electrical contacts controlling said load device and effective upon movement from a first to a second relationship to change the state of said load device, second electro-responsive means including a second coil responsive to variable current therethrough for moving said contacts relative to one another between said first and second relationships, temperature sensing means in heat transfer relationship with the body, circuit means interconnecting said electro-thermal means, said first and said second coils and said temperature sensing means, said temperature sensing means responding to variations in the temperature of the body to correspondingly vary the current through said first and said second coils, manually adjustable means for selecting the temperature at which said electrical contacts will be moved to said second relationship, and means connecting said manually adjustable means to said second indicating pointer so that said selection is reflected in the position of said second pointer relative to said scale.

17. The combination of claim 16, further characterized in this that said manually adjustable means includes means for varying the relationship between said electrical contacts.

18. The combination of claim 16, further characterized in this that said manually adjustable means includes a variable resistance element as an element of said circuit means.

19. The combination of claim 1 in which said first heating means is connected to the source through self-interrupting electrothermal voltage regulating means and in which said means including said second heating means is energized directly from the source and is subjected to the voltage variations thereof.

20. In a load controlling apparatus for applying electrical energy from a source of electrical energy to an electrical resistance type heater as a series of rapidly recurring pulses the average value of which is varied in accordance with the sensed temperature of a body, temperature sensing means in heat transfer relation with the body comprising a resistor having a high temperature coefficient of resistance, a self-interrupting electro-thermal element including a first pair of matable electrical contacts, a first polymetallic member and a heater winding in transfer relation with said polymetallic member, means including said resistor, said element and means connecting said element to the source for supplying a pulsating voltage having an average magnitude which varies in accordance with the temperature sensed by said temperature sensing means, a second pair of matable electrical contacts including a first and a second electrical contact, means including said second pair of electrical contacts for controlling the energization of the heater, a second polymetallic member for controlling the position of said first electrical contact, first electrical resistance heating means in heat transfer relation with said second polymetallic member, circuit means for applying said pulsating voltage to said first electrical resistance heating means, second electrical resistance heating means, and means including said second electrical resistance heating means and said second pair of electrical contacts for repetitively moving one of said second pair of electrical contacts into and out of engagement with the other one of said second pair of electrical contacts independently of changes in the sensed temperature of the body.

21. The combination of claim 4 in which said one of said electrical contacts is said first contact and in which said positioning means and contact moving means both include a common thermally deflectable member bendable in response to energization of said heating means and controlling the position of said first contact.

22. The combination of claim 21 in which said thermally deflectable member includes a pair of generally parallel leg portions one of which carries said first electrical contact at one end, the other one of which is anchored at one end and the other ends of both of which are interconnected, equal heating of said portions tending to produce equal and opposite effects upon the position of said first contact for compensating for ambient temperature variations.

23. The combination of claim 22 in which energization of said first and second heating means produces heating of but one of said leg portions.

24. The combination of claim 22 further including manually rotatable means for shifting the position of said second electrical contact relative to said first electrical contact.

References Cited in the file of this patent

UNITED STATES PATENTS

| | | |
|---|---|---|
| 1,961,252 | Shivers | June 5, 1934 |
| 1,973,620 | Gille | Sept. 11, 1934 |
| 2,324,647 | Ray | July 20, 1943 |
| 2,499,906 | Crise | Mar. 7, 1950 |
| 2,510,038 | Rudahl | May 30, 1950 |
| 2,510,040 | Rudahl | May 30, 1950 |
| 2,615,085 | Smulski | Oct. 21, 1952 |
| 2,727,973 | Collins | Dec. 20, 1955 |
| 2,762,997 | Boddy | Sept. 11, 1956 |
| 2,782,401 | Boddy | Feb. 19, 1957 |
| 2,835,885 | Boddy | May 20, 1958 |
| 2,846,556 | Whinery | Aug. 5, 1958 |

UNITED STATES PATENT OFFICE
CERTIFICATE OF CORRECTION

Patent No. 2,910,569                                                                October 27, 1959

Leonard Boddy

It is hereby certified that error appears in the printed specification of the above numbered patent requiring correction and that the said Letters Patent should read as corrected below.

Column 11, line 75, for "means in said heat" read -- means in heat --.

Signed and sealed this 12th day of April 1960.

(SEAL)
Attest:

KARL H. AXLINE
Attesting Officer

ROBERT C. WATSON
                                                                                      Commissioner of Patents